United States Patent [19]

Adler et al.

[11] 4,373,841
[45] Feb. 15, 1983

[54] QUICK RELEASE LOAD SECURING DEVICE

[75] Inventors: Franklin P. Adler, Michigan City, Ind.; Rudolph E. Nadherny, Naperville, Ill.

[73] Assignee: Illinois Railway Equipment Company, Chicago, Ill.

[21] Appl. No.: 194,059

[22] Filed: Oct. 6, 1980

[51] Int. Cl.³ .......................... B60P 7/10; B61D 3/16; B61D 45/00
[52] U.S. Cl. ........................ 410/34; 410/38; 410/100; 410/103
[58] Field of Search ............... 410/96, 97, 98, 99, 410/100, 101, 102, 103, 38, 34, 156

[56] References Cited

U.S. PATENT DOCUMENTS

| | | | |
|---|---|---|---|
| 2,628,397 | 2/1953 | Olson | 410/103 |
| 3,942,454 | 3/1976 | Broling | 410/100 |
| 4,273,484 | 6/1981 | Blanar | 410/103 X |
| 4,314,783 | 2/1982 | Parnell et al. | 410/34 |

Primary Examiner—Robert B. Reeves
Assistant Examiner—Howard Beltran
Attorney, Agent, or Firm—Lockwood, Dewey, Alex & Cummings

[57] ABSTRACT

Cargo carried on freight cars such as flat bed railway cars is secured in place by lading strapping that is tensioned around the cargo so as to compress a snubber unit of an integral, telescoping quick-release device that includes a sleeve slidably mounted in a housing secured directly to the side of the freight car, which sleeve is locked in a collapsed condition within the housing and unlocked to move between the collapsed condition and a telescoping condition, the sleeve having therewithin an anchor rod that telescopes from the sleeve in opposition to bias provided by the snubber unit. Unlocking of the quick-release device substantially reduces tension within the lading strapping before it is removed from the cargo.

23 Claims, 12 Drawing Figures

QUICK RELEASE LOAD SECURING DEVICE

BACKGROUND AND DESCRIPTION OF THE INVENTION

This invention generally relates to mechanisms for the quick release of tension in lading strapping that is secured about cargo, more particularly to an integral, telescoping quick-release mechanism having a housing directly secured to a railway freight car within which are sidably and telescopingly mounted a sleeve member and an anchor rod to which the lading strapping is attached, the sleeve being lockable within the housing to maintain tension in the lading strapping during transport of the cargo and being unlockable when desired to relieve the tension prior to removal of the lading strapping.

Various commodities are shipped in open freight carrying cars, requiring that such cargo be tied down for safe transport over long distances and rough terrain or tracks, such commodities including, for example, logs, lumber, plaster board, and large bulky items such as machinery. In some instances, the lading strapping, which typically are steel bands, are secured to bolts, U-brackets, hooks, or the like that are simply welded to the railway car, and the strapping is typically removed by severing or otherwise unfastening the strapping which then has a tendency to spring around the cargo and fly up, posing a possible danger to workmen and/or the cargo.

Often, such lading strapping systems incorporate snubbing devices to develop and maintain tension within the lading strapping while the cargo is being transported, but at times these devices are not structured so as to be easily and quickly releasable, with the result that workers typically sever the lading straps while they are still under substantial tension around the cargo, whereupon they will usually spring up and fly about.

In an effort to enhance the ease of operation and improve the safety of these types of devices, quick-release mechanisms have been provided whereby the tension under which the lading straps are compressed can be substantially eliminated before the strapping is removed or severed. The types of quick-release mechanisms that are heretofore known are typically of a type which are mounted such that one end thereof is generally even with the deck level, often within troughs at the edge of the deck, and such that the bulk of the devices projects above deck level when it is under tension from the strapping. Usually such devices will be designed such that, when they are not in use for tensioning the strapping around cargo during transport thereof, they are supposed to lie within the trough for storage. It sometimes happens, however, that such devices are not properly laid within their respective troughs, but lie at least in part on the floor or bed of the freight car, at which position they can be readily damaged by lift trucks while the cargo is being unloaded from the freight car, or they can pose an obstacle for workers on the freight car. Even when such devices are properly stored in their troughs when not in use, they are subject to being damaged by rattling about within the troughs or to bouncing out of the troughs as the car is transported over rough terrain or tracks while they are not under tension from cargo strapping.

By the present invention, these various difficulties and problems are substantially removed by providing a telescoping type of quick-release mechanism that is rigidly mounted directly to the side of the freight trailer or car, the device having a structure such that tension within lading strapping secured over cargo can be locked into the device after having been manually locked by rotation of a sleeve relative to stationary housing. The device can then be quickly and readily released by rotating the sleeve to an unlocked position, after which the strapping can be safely removed or severed, at which time the quick-release mechanism automatically falls down by gravity into an integral, collapsed configuration free and clear of the trailer or car deck, the device being biased in this collapsed condition by gravitational forces even while the device is transported over rough terrain without being in use to anchor lading strapping over cargo, whereby the device generally maintains itself in its collapsed condition whereat it is safely tucked away to avoid interference with lift trucks or workmen.

It is accordingly a general object of this invention to provide an improved quick-release device for anchoring lading strapping.

Another object of the present invention is an improved lading strapping quick-release device of the integral type which collapses into itself when not in use.

Another object of the present invention is an improved quick-release mechanism for tensioned lading strapping which includes a locking means for maintaining at least a partially collapsed condition prior to and during telescoped positioning in order to quickly release tension within the lading strapping.

Another object of this invention is an improved quick-release device for anchoring lading strapping, which, when not in use, collapses into itself at a location generally flush with the floor of the trailer or car.

These and other objects of the present invention will be apparent from the following detailed description of two particular embodiments thereof, taken in conjunction with the accompanying drawings, wherein:

Both embodiments operate in substantially the same manner. The device is first locked by generally horizontal movement of a sleeve arm to rotate its sleeve within a stationary housing, and a lading strap is fastened to an upper portion of the device. Then, the lading strap is put under tension while snubber means within the device is compressed in opposition to the strap tensioning forces, at which time the cargo is ready for shipment. Upon reaching the desired destination, the device is unlocked by generally horizontal movement of the sleeve arm, thereby permitting the sleeve to move upwardly in response to the tension within the strapping and snubber means to thereby release such tension, after which the strapping may be readily and safely removed to permit unloading of the cargo.

Figure 1:
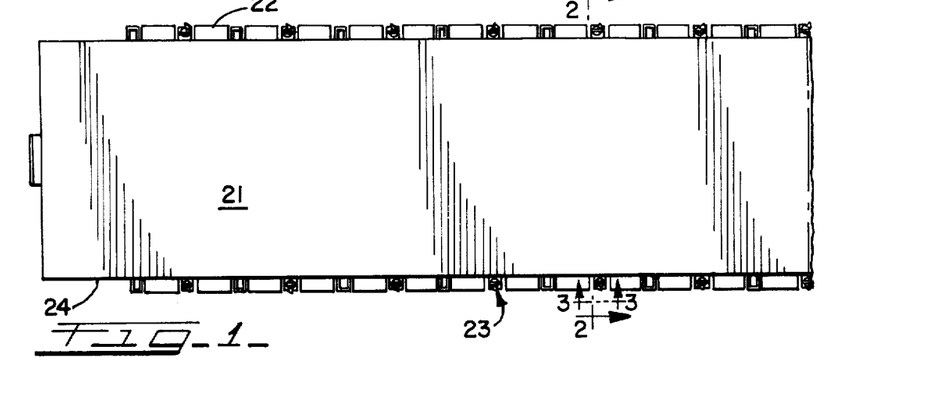
FIG. 1 is a plan view of a portion of a flat bed car having a plurality of quick-release mechanisms according to this invention.
Figure 2:
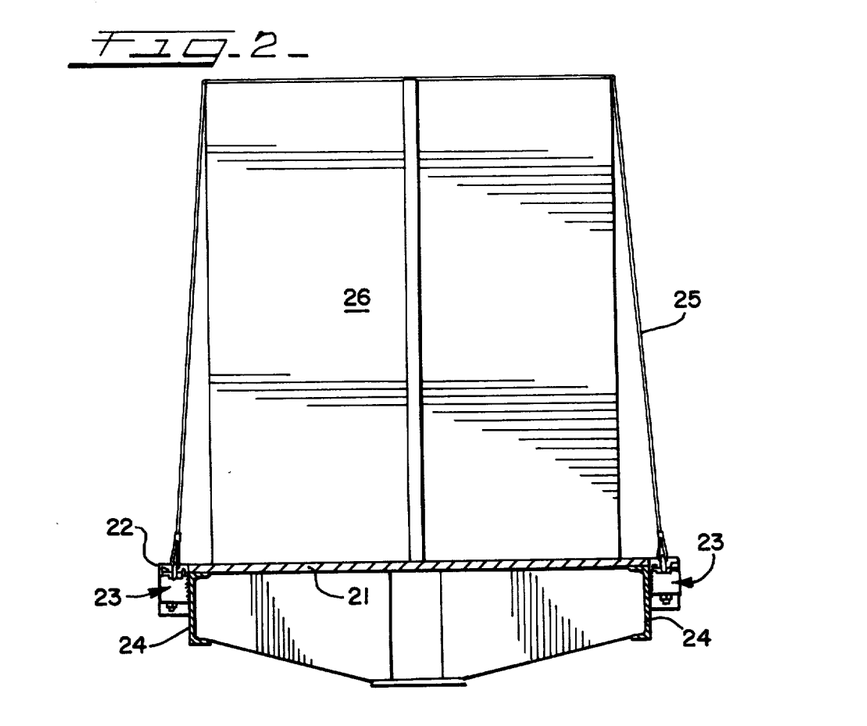
FIG. 2 is a sectional view generally through line 2—2 of FIG. 1.

A flat bed car 21, illustrated in FIGS. 1 and 2, includes a plurality of storage troughs 22 that are sometimes included on railway flat cars for storage of nontelescoping devices according to this invention, which are designated generally at 23, can be securely fastened directly to a side sill 24 of the car, there being no need to include the storage troughs 22. A length of lading strapping 25 is shown tensioned over cargo 26, which is ready for transport.

Device 23, which is more fully illustrated in FIGS. 3 through 8, includes a housing 27 and a sleeve 28 in sliding, operative interengagement with each other and an anchor rod 29 in sliding, operative interengagement with the sleeve 28, the anchor rod 29 having snubber means 31 and means 32 for receiving the lading strapping 25. Locking means locks the sleeve 28 with respect to the housing 27 in order to maintain a collapsed condition thereof when desired, while abutment means at an inside surface 33 of an upper panel of the housing 27 defines the uppermost limit of movement of the sleeve 28 with respect to the housing 27.

Figures 3, 4, 5:
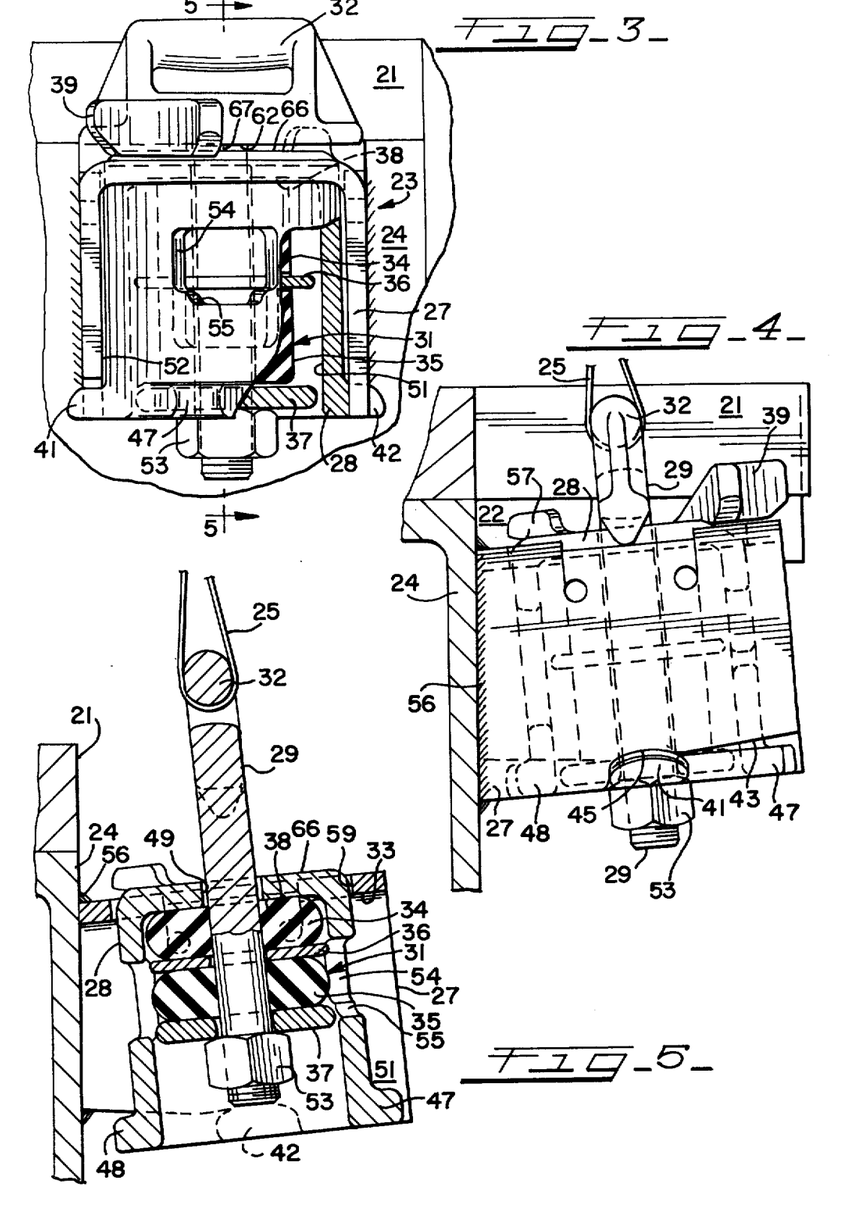
FIG. 3 is a front elevational view, partially broken away, generally along line 3—3 of FIG. 1, illustrating the preferred embodiment of this invention in its locked and relaxed position.
FIG. 4 is a side elevational view of the locked and relaxed device illustrated in FIG. 3.
FIG. 5 is a sectional view generally along the line 5—5 of FIG. 3, except that the device is shown in its locked and tensioned condition.

With more particular reference to FIG. 3, this illustrates the device 23 in its locked position and in which the snubber means 31 is slightly tensioned; that is, elastomeric inserts 34, 35 are compressed slightly between thrust plates 36, 37 and up against an underside thrust surface 38 of the sleeve 28, this slight tension being just adequate to snug a transverse portion of the sleeve 28 up against the housing 27 to secure the device 23 in its locked position. The locked position was achieved by rotating the sleeve 28 within the housing 27 and generally along the longitudinal axis of the anchor rod 29. The illustration of this invention in FIGS. 3 through 8 requires a clockwise rotation, as viewed from the top as in FIG. 6, in order to move the device 23 into its locked position; more particularly, a sleeve arm 39 is moved generally to the left by a sledge or pry bar (not shown) until ears 41, 42 move along shortened side portions 43, 44 of the housing 27 and into indents 45, 46 therein.

This seating of the ears 41, 42 into the indents 45, 46 tends to assist in preventing the device 23 from becoming unlocked during rotation of the receiving means 32 in order to better align same with the strapping 25 when the other end thereof is affixed to the car 21 at a location other than directly across the width of the car from the particular locked device 23. The device is more securely maintained in its locked position during rotation of the receiving means 32 by structural relationships between an underside surface 61, 62 of a stop 63 of the receiving means 32, a sliding surface 64 on the top of the housing 27 and stops 65 at the ends thereof, and also a top surface 66 of the sleeve 28.

With more particular reference to these structural relationships to virtually assure that the device 23 will remain locked, even when the receiving means 32 is rotated prior to tensioning of the snubber means by the lading strapping 25, a primary feature of these relationships is to provide a clearance 67 (FIG. 3) between the underside surface interior portion 62 of the receiving means 32 and the top surface 66 of the sleeve 28, whereby rotational forces imparted to the receiving means 32 will not be transferred to the sleeve 28, which force transfer would tend to rotate the sleeve 28 and unlock the device 23.

Figures 6, 7, 8:
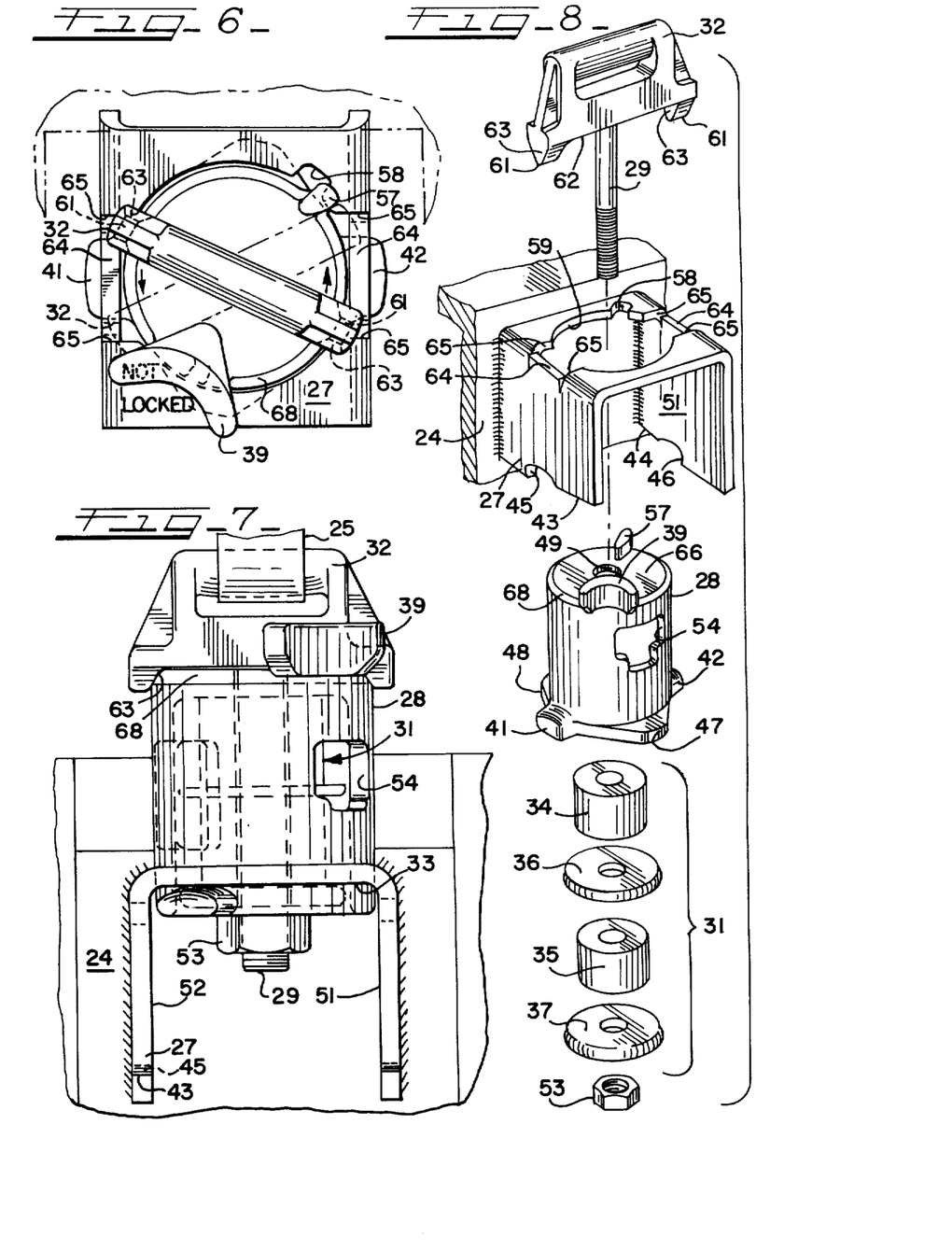
FIG. 6 is a top plan view of the preferred device shown in its locked position and illustrating the ability of the anchor rod to be rotated without unlocking the device.
FIG. 7 is a front elevational view of the preferred device in its unlocked and relaxed condition after quick release and prior to removal of the lading strap.
FIG. 8 is an exploded, perspective view of the device of FIG. 3.

Receiving means 32 is shown in solid lines in FIG. 6 rotated to its most clockwise position and in phantom rotated to its most counterclockwise position, its respective stops 63 butting against the respective housing stops 65 in each position. Particularly important is the feature that, with the receiving means 32 in its most counterclockwise position and with the sleeve arm 39 in its most clockwise or locked position (FIG. 6), further counterclockwise rotation of the receiving means 32 is prevented, thereby avoiding inadvertent unlocking of the collapsed device 23 by counterclockwise movement of the sleeve 28 caused by having receiving means 32 push the sleeve arm 39 and/or the dog 57. Full tensioning of the snubber means 31 can now be accomplished, with the receiving means 32 being in its desired attitude or angular orientation.

When the device 23 is subsequently unlocked to release the tension in the strapping 25 and snubber means 31, the sleeve 28 extends upwardly out of the housing 27 and remains at its locked attitude as the clearance 67 is substantially eliminated in view of the bias provided by the slightly tensioned snubber means 31 and the inside surface of stop 63 is preferably in frictional engagement with a tapered annular end surface 68 of the sleeve 28. After the lading strapping 25 is severed, the sleeve 28 falls without any substantial rotation of the receiving means 32 with respect to the sleeve 28 because of the frictional interengagement therebetween and without any substantial rotation of the sleeve 28 with respect to the housing 27 due to the positioning of the sleeve ears 41, 42 and sleeve flanges 47, 48 in close proximity and sliding engagement with inside walls 51, 52 of the housing 27 when the device 23 is in its unlocked position.

The flanges 47, 48 also serve to limit the extent of rotation of the sleeve 28 when it moves to the unlocked position, at which time the flanges 47, 48 butt against inside walls 51, 52 of the housing 27, and the flanges 47, 48, furthermore, cooperate with the ears 41, 42 to prevent passage of the sleeve 28 upwardly through the housing 27 when the device 23 is in its unlocked position.

Receiving means 32 may take the form of an eye as illustrated, a hook, an open slot, or the like, and when the strapping is placed therethrough, preferably with the device 23 locked, the device 23 is ready to be tensioned to the condition illustrated in FIG. 5. While the device 23 is locked, the strapping 25 is pulled tightly around the cargo 26 by some conventional means, at which time an upward force is imparted to the receiving means 32 and thus to the anchor rod 29 and its locking nut 53, whereby the thrust plates 36, 37 and the underneath thrust surface 38 impart forces to the elastomeric inserts 34, 35 in order to compress same such that the anchor rod 29 moves generally upwardly through a bore 49 of the sleeve 28.

Typically, the snubber means 31 will provide a force of approximately three thousand pounds when the elastomeric inserts 34, 35 are compressed for maintaining tension in the lading strapping for transport of cargo. As an optional feature of this invention, a window 54 having an indicator portion 55, provides a sighting for indicating when the desired level of approximately three thousand pounds is reached, which condition is indicated when the lower thrust plate 37 is fully in view through the indicator portion 55 as generally illustrated in FIG. 5.

FIGS. 4 and 5 also illustrate the preferred arrangement for mounting the device 23 onto the side sill 24, the mounting being a very rigid attachment such as by the welding 56 illustrated. Preferably, the housing 27 is somewhat wider at its bottom end than at its top end such that the axis of the device, generally lying along the anchor rod 29, is not parallel to the side sill 24, which means that it is not truly perpendicular to the deck 21, whereby the axis of the device 23 will usually be more in line with the strapping 25 as it lies over the cargo 26 in order to lessen the development of forces that are not parallel to the axis of the device 23.

A particular feature of this embodiment, which is perhaps best illustrated in FIG. 4, is the location of the sleeve arm 39 with respect to the deck 21, the sleeve arm 39 being at roughly the same level as the deck 21, which feature is useful when the deck 21 is positioned adjacent a loading dock (not shown) of a height substantially the same as the deck 21. By providing the sleeve arm 39 at the illustrated height, easy access thereto is possible even when the deck 21 is adjacent a loading dock.

The unlocked position of the device 23 is illustrated in FIG. 7, this figure illustrating the situation after the device 23 is released from its tensioned condition by unlocking the device through movement of the sleeve arm 39 to the right, or counterclockwise, as viewed in FIG. 6, whereby the ears 41, 42 move out of the indents 45, 46, and along the shortened side portions 43, 44 until they clear the housing 27 entirely, at which time the flanges 47 and 48 typically stop against the inside walls 51 and 52, respectively, whereupon the tension applied to the device 23 causes the sleeve 28 to move generally upwardly through an opening 59 in the upper panel of the housing 27, while the anchor rod remains at its same approximate absolute position as it moves downwardly with respect to and within the sleeve 28, thereby substantially relieving the tension within the snubber means 31 and hence the strapping 25 so that the strapping may be severed for removal of the cargo 26.

Once the strapping 25 is severed, the sleeve 28 and the substantially untensioned snubber means 31 therewithin slide, by gravitational forces, down into the housing 27, and out of the way of cargo handling vehicles and workmen. The device may then remain in this position or be moved to its locked condition during transport of the vehicle before cargo is loaded thereonto. In order to improve the stability of the device 23 on its unlocked condition, the dog 57 may be included, the undersurface of which will generally bear against the top surface of the housing 27 in order to reduce swinging movement of the sleeve 28 within the housing 27 when the vehicle is transported in an unloaded condition.

Another feature of this invention is the ease with which the various parts may be repaired or replaced without having to break the weld 56 or the like between the housing 27 and the side sill 24. The entire device 23 is readily taken apart, as best illustrated in FIG. 8, by removal of the locking nut 53, at which time the anchor rod 29 and the various parts of the snubber means 31 are separated, after which the sleeve 28 can be removed from the housing 27 by rotating the sleeve 28 until the dog 57 is in alignment with a slot 58 within the top surface of the housing 27 such that the sleeve 28 is tilted until the dog 57 passes through the slot 58, after which the tilting may be continued until the sleeve arm 39 closes the opening 59 through the upper panel of the housing 27 and the sleeve 28 is completely clear of the housing 27 for replacement or repair thereof.

Referring to the embodiment illustrated in FIG. 9 through FIG. 13, such relates to an integral, telescoping device 123 having a housing 127 attached to side sill 24 by welding 156 or the like, a sleeve 128 and an anchor rod 129, with snubber means 131 and receiving means 132 affixed to the anchor rod 129. This embodiment operates in substantially the same telescoping and collapsing manner as does the embodiment of FIG. 3 through FIG. 8.

Figure 9:
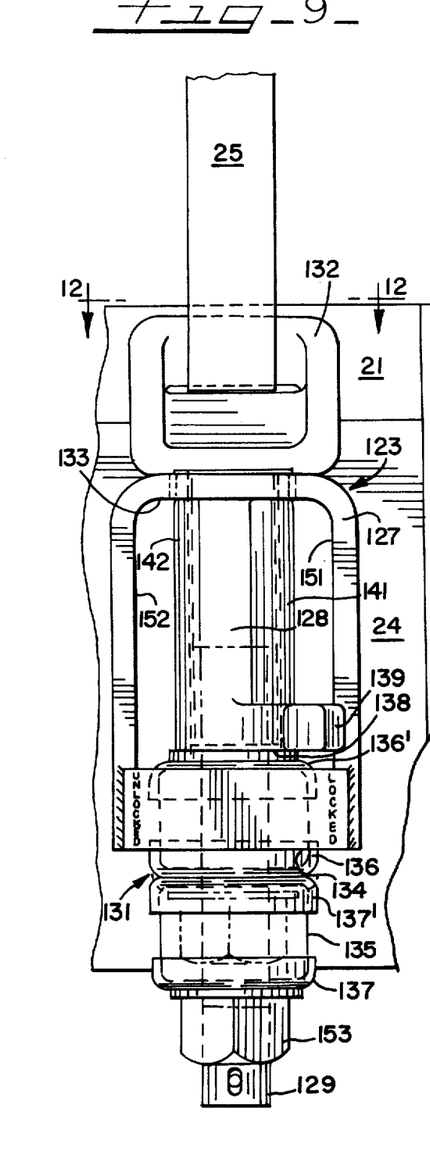
FIG. 9 is a front elevational view of an alternative embodiment according to this invention illustrating the locked and relaxed position thereof.

FIG. 9 illustrates the locked and relaxed or uncompressed position of the integral, telescoping device 123. A sleeve arm 139 is positioned to the right, or counterclockwise, as viewed from the top, typically until the sleeve arm is stopped by an inside wall 127, this engagement also being illustrated in FIGS. 10 and 12. In this locked and relaxed condition, both the anchor rod 129 and the sleeve 128 are collapsed within the housing 127.

Figure 10:
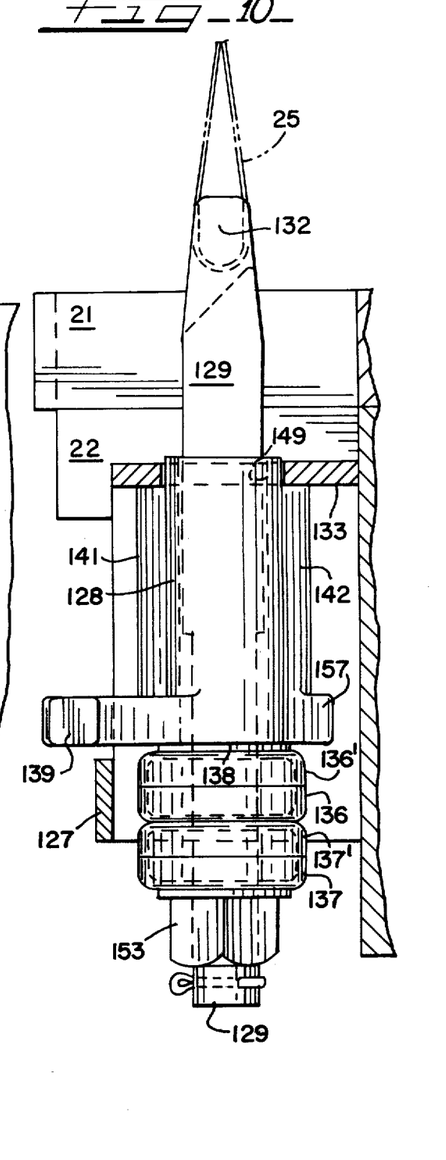
FIG. 10 is a side elevational view of the device of FIG. 9, partially in section, illustrating same in its locked and tensioned position.

In the locked and tensioned condition illustrated in FIG. 10, the engagement between the ears 141, 142 and the inside surface 133 is maintained while the anchor rod 129 is moved upwardly to impart a force to a locking nut 153 to thus compress and tension elastomeric inserts 134, 135 between pairs of thrust cups 136, 136' and 137, 137' and against an underside thrust surface 138 of the sleeve 128, during which the anchor rod 129 telescopes through a bore 149 in the sleeve 128, and the extent of compression of the elastomeric inserts 134, 135 can be engaged by the amount of their movement up into the housing 127.

Figures 11, 12, 13:
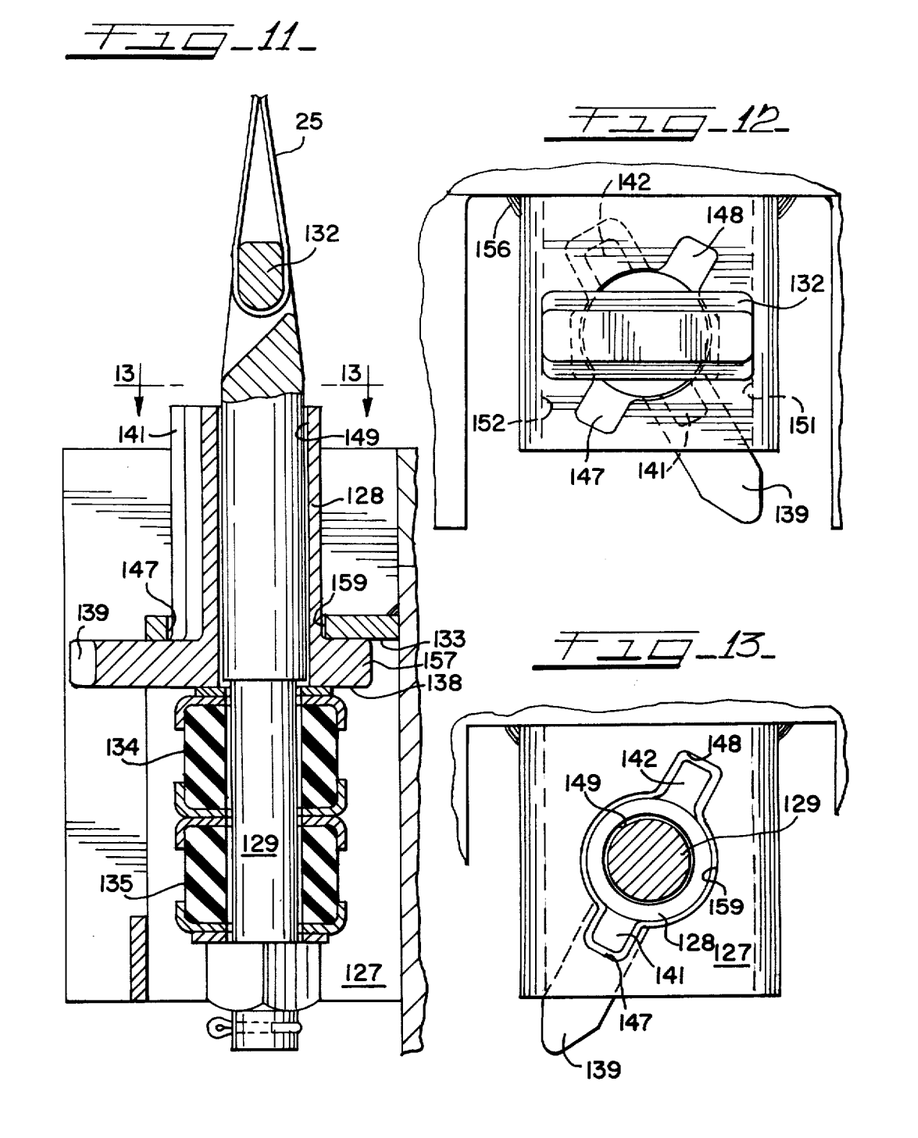
FIG. 11 is a side elevational view, partially in section, of the device of FIG. 9 in its locked and relaxed condition after quick release and prior to removal of the lading strap.
FIG. 12 is a top plan view along the line 12—12 of FIG. 9, further illustrating the locked position.
FIG. 13 is a top plan view along the line 13—13 of FIG. 11, illustrating the unlocked position.

The unlocked position of the device 123 is illustrated in FIGS. 11 and 13, this condition having been accomplished by movement of the sleeve arm 139 to the left, or generally clockwise, as viewed from the top in FIG. 13, typically until the sleeve arm 139 is stopped by an inside wall 152 of the housing 127, whereby the sleeve 128 is rotated until the ears 141, 142 are in alignment with slots 147, 148, respectively, that are coextensive with an opening 159 in the upper panel of the housing 127, at which time the tension within the device 123 pushes the sleeve 128 upwardly through the opening 159 until the upper surface of the sleeve arm 139 and of an ear 157 engage the inside surface 133 of the upper panel of the housing 127, after which the elastomeric inserts 134, 135 are substantially uncompressed and the strapping 25 may be removed.

It will be apparent to those skilled in this art that the present invention can be embodied in various forms; accordingly, this invention is to be connected and limited only by the scope of the appended claims.

We claim:

1. Integral, telescoping quick-release device for anchoring lading strapping to railway freight cars, comprising:
   - a housing secured to a railway freight car, said housing having an opening through an upper panel thereof;
   - a sleeve in sliding, operative interengagement with said housing, said sleeve having a longitudinal axis, at least a portion of said sleeve being slidable through said opening of the housing, said sleeve having a bore;
   - abutment means of said sleeve for engaging the upper panel of the housing at a location to prevent upward passage of said sleeve completely through said opening;
   - an anchor rod in sliding, operative interengagement with said sleeve, at least a portion of said anchor rod being slidable through said bore of the sleeve;
   - snubber means secured to said anchor rod;
   - receiving means on said anchor rod for securing a length of lading strapping to the quick-release device and for transmitting tension within the lading strapping to the snubber means; and
   - locking means for rotation about the longitudinal axis of said sleeve, said locking means engaging said sleeve with said housing at a locked position in which said sleeve is collapsed within said housing and for rotationally unlocking the quick-release device to reduce the tension within the snubber means.

2. The device of claim 1, wherein said sleeve and said anchor rod telescope generally above said housing.

3. The device of claim 1, wherein said snubber means is generally within said housing below an underside thrust surface of said sleeve.

4. The device of claim 1, wherein gravitational forces collapse said anchor rod into said sleeve and said sleeve into said housing when said tension within said lading strapping is reduced.

5. The device of claim 1, wherein said locking means is activated by a generally horizontally movable sleeve arm.

6. The device of claim 1, wherein said housing is rigidly secured to a side sill of the freight car.

7. The device of claim 1, wherein said sleeve includes a generally horizontally movable sleeve arm for operating said locking means, said inside walls of said housing generally define limits of the generally horizontal movement of said sleeve arm.

8. The device of claim 1, wherein said snubber means includes an elastomeric insert and a thrust member mounted onto said anchor rod.

9. The device of claim 1, wherein said locking means includes a generally horizontally movable sleeve arm and an ear on said sleeve in sliding engagement with a slot through said upper panel of the housing when in an unlocked position and in abutting engagement with said upper panel of the housing when in a locked position.

10. The device of claim 1, wherein said anchor rod and sleeve have a maximum height equal to that of the freight car track when the device is collapsed.

11. The device of claim 10, wherein said locking means includes a generally horizontally rotatable sleeve arm on said sleeve that is above said upper panel of the housing.

12. The device of claim 1, wherein said sleeve is rotatable within said housing generally about the longitudinal axis of said anchor rod, and wherein said anchor rod is rotatable about its axis within said sleeve.

13. The device of claim 1, wherein said abutment means includes an ear on said sleeve and an inside surface of said upper panel of the housing.

14. The device of claim 1, wherein means are provided for gauging the extent of compression of an elastomeric insert of the snubber means.

15. The device of claim 1, wherein said locking means includes an ear on said sleeve, an indent of said housing for receiving said ear, and a generally horizontally movable sleeve arm.

16. The device of claim 1, wherein said locking means includes a generally horizontally rotatable sleeve arm on said sleeve that is above said upper panel of the housing.

17. The device of claim 12, further including stops on the receiving means of the anchor rod for engaging stops of a sliding surface on said housing in order to limit rotation of the anchor rod.

18. The device of claim 12, further including a clearance between an underside surface interior portion of the receiving means and the top surface of the sleeve when the device is in its locked position to substantially eliminate frictional, rotation imparting engagement between the receiving means and the sleeve.

19. The device of claim 12, further including an ear and a flange projecting from said sleeve to substantially eliminate rotation of the sleeve with respect to the housing while the device is in its telescoped position and while the device is falling from its telescoped position to its collapsed position.

20. The device of claim 12, wherein said receiving means and said sleeve are in frictional, substantial rotation-preventing engagement with each other when the device is not locked.

21. The combination of a railway freight car of the type having a deck and a side sill with a device for securing cargo thereonto by lengths of lading strapping anchored by a quick-release device having receiving means for holding the lading strapping over the cargo, the quick-release device being an integral, telescoping device comprising:
   - a housing secured to the side sill of the railway freight car, said housing having an opening through an upper panel thereof;
   - a sleeve in sliding, operative interengagement with said housing, said sleeve having a longitudinal axis, at least a portion of said sleeve being slidable through said opening of the housing, said sleeve having a bore;
   - abutment means of said sleeve for engaging said upper panel of the housing at a location to prevent upward passage of said sleeve completely through said opening;
   - said receiving means including an anchor rod in sliding, operative interengagement with said sleeve, at least a portion of said anchor rod being slidable through said bore of the sleeve;
   - snubber means secured to said anchor rod, said snubber means being tensioned by tension within the lading strapping;
   - locking means for rotation about the longitudinal axis of said sleeve, said locking means engaging said sleeve with said housing at a locked position in which said sleeve is collapsed within said housing and for rotationally unlocking the quick-release device to reduce the tension within the snubber means.

22. The combination of claim 21, wherein said anchor rod and said sleeve, when the device is collapsed, have a maximum height equal to that of the deck of the freight car.

23. The combination of claim 21, wherein said locking means includes a generally horizontally movable sleeve arm that has a maximum height equal to that of the deck of the freight car.

* * * * *